United States Patent

Dahlem

[11] 4,065,277
[45] Dec. 27, 1977

[54] INLET FOR CYCLONE-TYPE PARTICULATE MATTER GAS SEPARATOR DEVICE

[75] Inventor: Francis E. Dahlem, Louisville, Ky.

[73] Assignee: American Air Filter Company, Inc., Louisville, Ky.

[21] Appl. No.: 714,110

[22] Filed: Aug. 13, 1976

[51] Int. Cl.$^2$ .................. B01D 51/00; B01D 45/12
[52] U.S. Cl. .................. 55/418; 55/459 C; 55/459 D; 209/144
[58] Field of Search .......... 55/312, 314, 331, 348, 55/418, 447, 452, 456, 457, 459 R, 459 D, 459 C; 209/144; 210/512 R

[56] References Cited

U.S. PATENT DOCUMENTS

| 3,501,900 | 3/1970 | Warner et al. | 55/456 |
| 3,707,830 | 1/1973 | Gustausson | 55/418 |
| 3,802,167 | 4/1974 | Turman | 55/457 |

FOREIGN PATENT DOCUMENTS

| 30,590 | 2/1960 | Finland | 55/447 |
| 1,298,879 | 12/1972 | United Kingdom | 55/456 |

*Primary Examiner*—Frank W. Lutter
*Assistant Examiner*—David L. Lacey
*Attorney, Agent, or Firm*—Jon C. Winger

[57] ABSTRACT

A dirty gas inlet configuration for a cyclone-type particulate matter gas separator device has two annular concentrically disposed converging dirty gas channels. The outer annular channel has a plurality of gas flow directing vanes disposed therein to impart a spinning or whirling motion to a dirty gas stream passing into the separator device through the outer annular channel from outside the separator device. The inner annular channel has an adjustable dirty gas inlet for varying the volume rate of flow of dirty gas passing into the separator device through the inner annular channel from outside the separator device. The dirty gas streams exiting the outer and inner annular converging channels are mixed together in an annular mixing chamber located downstream from and coaxially disposed with the outer and inner annular channels. While mixing together, the whirling gas stream from the outer channel imparts a whirling motion to the dirty gas stream from the inner annular channel. The mixed whirling gas stream then exits the annular mixing chamber and moves downstream in the gas separator device for further processing to separate particulates therefrom.

10 Claims, 5 Drawing Figures

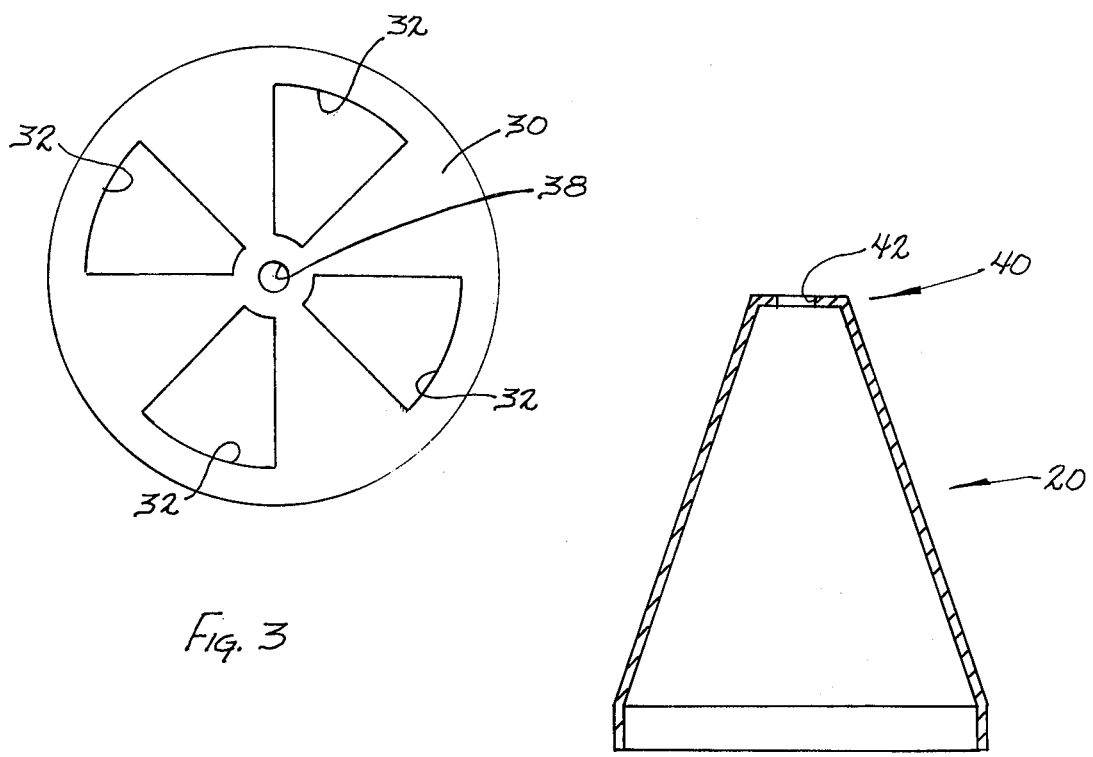
Fig. 3
Fig. 4
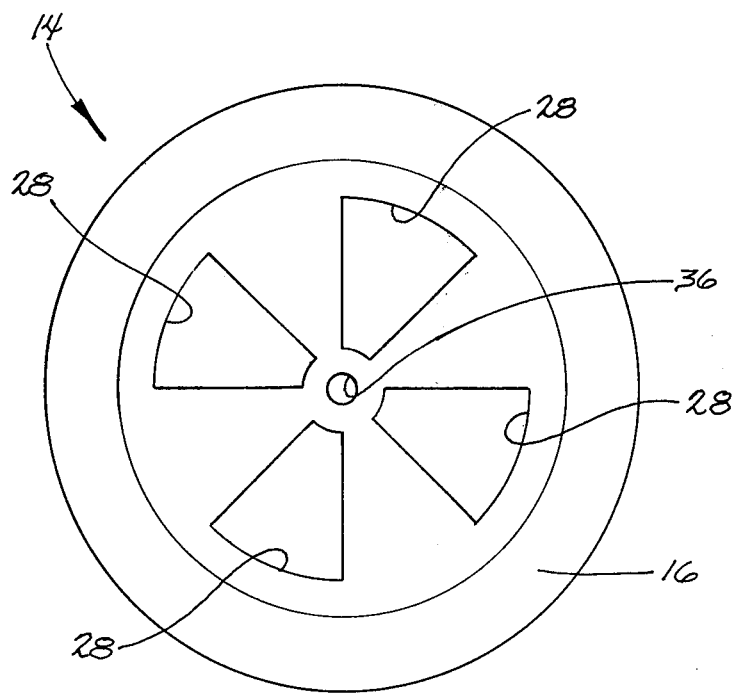
Fig. 5

INLET FOR CYCLONE-TYPE PARTICULATE MATTER GAS SEPARATOR DEVICE

BACKGROUND OF THE INVENTION

The present invention relates to gas separation and more particularly to a dirty gas inlet configuration for cyclone-type particulate matter gas separation devices.

Cyclone-type separators are typically comprised of a generally cylindrical housing with a dirty gas inlet at one end having means for imparting a rotating or whirling motion to the incoming dirty gas stream to centrifuge particulates therefrom, means to direct the flow of clean gas out of the housing through a clean gas outlet and the separated particulates out of the housing through a particulate outlet.

The centrifugal effect on the dirty gas stream flowing through the separator is a function of the dirty gas stream velocity. Therefore, it is important to maintain an adequate dirty gas stream velocity regardless of the volume rate of flow of dirty gas entering the separator. One way to accomplish this goal is to be able to vary the cross-sectional area of the dirty gas inlet into the separator device.

One known device which incorporates means for adjusting the cross-sectional area of the dirty gas inlet is disclosed in U.S. Pat. No. 3,707,830; issued on Jan. 3, 1973 to Karl-Axel G. Gustavsson. This device provides a cylindrical gas separator housing having a conically shaped converging inlet end, and a cylindrical guide vane axially displaceably disposed in the conical inlet with a plurality of gas directing vanes extending from the periphery of the cylindrical guide vane body. To compensate for low volume rates of flow of dirty gas the cylindrical body is displaced axially further into the converging dirty gas inlet thereby maintaining the velocity of the gas stream passing through the annular area at a predetermined value. Likewise, to compensate for higher volume rates of flow of dirty gas the cylindrical guide vane body is displaced axially outwardly of the converging conical housing inlet, thus, increasing the annular area thereby maintaining the velocity of the gas stream passing through the annular area at the predetermined value.

However, this device has a number of drawbacks. As the cylindrical guide vane body is displaced axially outwardly of the conical housing outlet, a space is created between the free ends of the gas directing vanes and the wall of the conical converging housing inlet. The dirty gas stream entering the separator through this space does not have a whirling motion imparted to it. Further, the portion of the dirty gas stream flowing through this space is directed by the conical converging inlet toward the center of the separator housing. Because the function of a cyclone-type separator is to centrifuge particulates out of the gas stream toward the wall of the separator housing, these two characteristics, in the least, do not contribute to the desired function of the separator and, more than likely, detract from it. A further drawback of this device is that it is difficult to both rigidly mount the guide vane body and provide for its axial movement in the conical converging inlet. Rigid mounting of the guide vane body is important in order to maintain a uniform annular space between the guide vane body and wall of the conical inlet. Thus, the structure and mechanism required to rigidly mount and axially move the guide vane body into and out of the conical housing inlet is relatively complicated and expensive. This mounting structure and mechanism becomes even more complicated when a plurality of such separator devices are assembled together to form a bank of devices as is common practice in order to clean large volumes of air.

SUMMARY OF THE INVENTION

The present invention recognizes the drawbacks of the heretofore known inlet configurations for cyclone-type particulate matter gas separator devices and provides a solution which is straightforward, and inexpensive to manufacture and maintain.

More particularly, the present invention provides a dirty gas inlet configuration for a cyclone-type particulate matter gas separator, comprising: means defining an outer annular converging channel for directing a stream of dirty gas into the separating device and accelerating the stream of dirty gas; means defining an inner annular converging channel concentrically disposed with the outer annular converging channel for directing a stream of dirty gas into the separating device and accelerating the stream of dirty gas; and, gas flow directing means disposed within the outer annular channel for imparting a whirling motion to the gas stream flowing through the outer annular channel into the device.

DESCRIPTION OF THE DRAWINGS

A better understanding of the present invention can be had upon reference to the accompanying specification and by reference to the following drawings in which like numerals refer to like parts throughout the several views and in which:

FIG. 3 is a front view of one component of the present invention;

FIG. 4 is a side view of another component of the present invention; and,

FIG. 5 is a front view of another component of the present invention.

DETAILED DESCRIPTION OF THE ADVANTAGEOUS EMBODIMENTS

Figure 1:
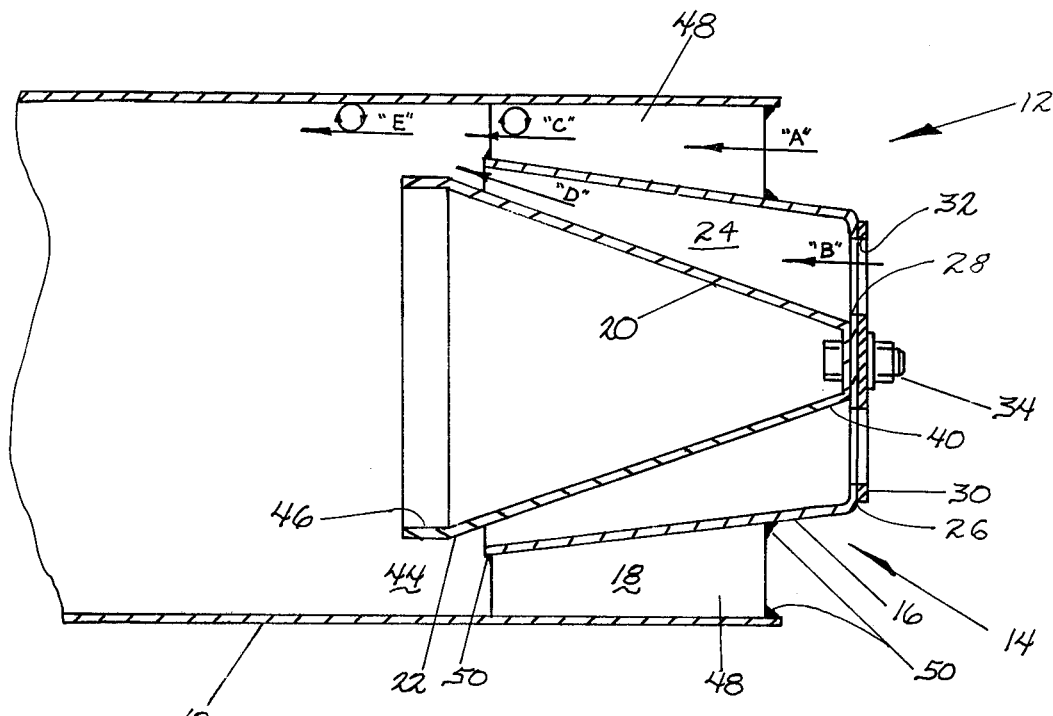
FIG. 1 is a sectional side view of an advantageous embodiment of the present invention.

Referring first to FIG. 1, there is illustrated a portion of a cyclone-type particulate matter gas separator device which comprises a cylindrical housing 10 having an open inlet end, generally denoted as the numeral 12, for the ingress of a dirty gas stream to be cleaned. A hollow generally conoid shaped hub 14 is concentrically disposed within the dirty gas stream open inlet end 12. The side wall 16 of the hub 14 is radially spaced from the wall of the housing 10 and cooperates therewith to define an outer annular converging channel 18. A conoid shaped body 20 is concentrically disposed within the hollow hub 14 with its side wall 22 radially spaced from the wall 16 of the hub 14, thereby defining an inner annular converging channel 24 therebetween.

The hub 14 is illustrated as being a truncated cone having a partially closed apex forming an upstream face 26 with a plurality of dirty gas inlet apertures 28 (see FIG. 5) formed therethrough in a circular array. An inlet damper plate 30 formed with a like number of apertures 32 (see FIG. 3) also in a circular array is disposed in juxtaposition over the upstream surface 26 of the hub 14. The damper plate 30 is rotatably mounted to the upstream face 26 of the hub 14 by means of, for example, a nut and bolt assembly 34. The nut of the assembly 34 projects through appropriate bolt receiving holes 36 and 38 formed in the upstream surface 26 of hub 14 and the plate 30, respectively. Thus, the damper plate 30 can be selectively rotated to move the apertures 32 formed therein into or out of registration with the apertures 28 in the upstream surface 26 of the hub 14. The movable damper plate 30, with its apertures 32, functions with the upstream face 26, and its apertures 28, to form a simple yet effective means for varying the flow rate of a dirty gas stream into the inner annular converging channel 24.

The conoid shaped body 20 is illustrated as being a cone and is attached at its apex 40 to the downstream side of the upstream face 26 by means of the nut and bolt assembly 34, the bolt extending through an appropriate hole 42 formed in the apex 40. The conical body 20 extends axially downstream a predetermined distance beyond the conoid shaped hub 14. The portion of the side wall 22 of the body 20 which extends beyond the hub 14 is spaced from the wall of the housing 10 thereby defining an annular mixing channel 44 between the side wall portion 20 and wall of the housing 10. The body 20 further comprises a cylindrical flange 46 extending downstream from the periphery of the base of the body 20 in order to lengthen the annular mixing channel 44 without further convergence toward the wall of the housing 10.

Dirty gas flow directing means, such as a plurality of curved gas flow directing vanes 48, are disposed within the outer annular converging channel 18. The vanes 48 extend between the side wall 16 of the hub 14 and the wall of the housing 10 adjacent thereto. Each vane 48 is connected at one of its edges to the wall 16 of the hub 14 and at its opposite edge to the wall of the housing 10. In FIG. 1, the means for connecting the vanes 48 to the walls of the hub 14 and housing 10 is illustrated as tack welds 50. However, any one of a variety of conventional or convenient attachment means can be used.

Figure 2:
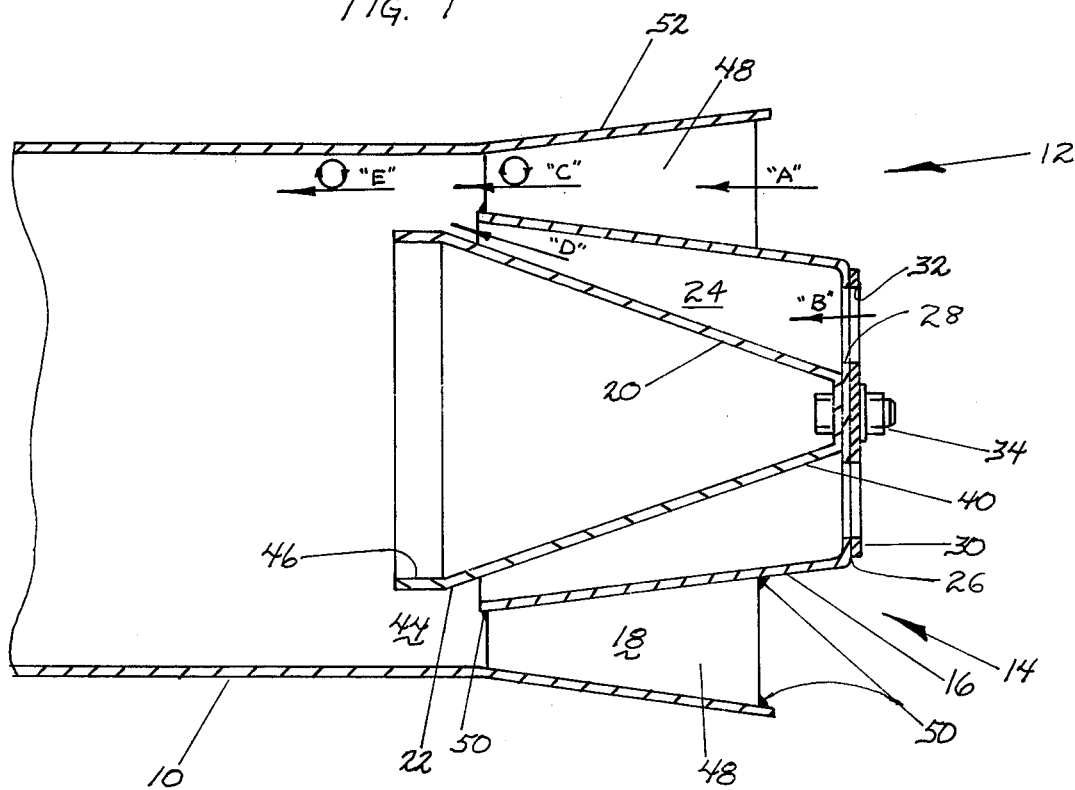
FIG. 2 is a sectional side view of another advantageous embodiment of the present invention.

FIG. 2 illustrates a somewhat modified inlet configuration which is identical in every respect to the inlet configuration of FIG. 1 except that the separator housing 10 comprises an open inlet end which forms a converging conically shaped inlet portion 52 instead of the uniform cylinder of FIG. 1.

In operation, a gas to be cleaned in the separator device enters the separator device through outer annular converging channel 18 (as indicated by arrows "A") and, a selected volume, through the inner annular converging channel 24 (as indicated by arrows "B"). The gas flowing through the outer annular converging channel 18 is accelerated due to the convergence of the channel 18 and at the same time is redirected from a generally linear motion into a whirling motion by the directional vanes 48 disposed in the outer channel 18. The whirling dirty gas stream is subsequently discharged from the outer annular converging channel 18 into the annular mixing channel 44 (as indicated by arrow "C"). Concurrently, the selected volume of dirty gas to be cleaned entering the separator device through open apertures 28 in the upstream face 26 of the hub 14 and into the inner annular converging channel 24 is also accelerated due to the convergence of the inner chamber 24. Necessarily, because of the construction of the inner annular converging channel 24 defined between the walls 16 of the hub 14 and body 20, the inner annular converging channel 24 discharges the dirty gas passing through it into the mixing channel 44 in a generally outwardly direction toward the wall of the housing 10 and into the whirling dirty gas stream emitting from the outer annular converging channel 18 (as indicated by arrow "D"). As the gases travel in the mixing channel 44, the dirty gas emitting from the inner annular converging channel 24 meets the whirling gas emitting from the outer annular converging channel 18 and they mix together. Due to friction, the whirling gas from the outer channel 18 imparts a like whirling motion to the gas from the inner channel 24. The now homogenous whirling gas leaves the mixing channel 44 (as indicated by arrow "E") for further processing downstream in the separator device where particulates are separated from the gas by any one of a variety of known, convenient, or otherwise yet to be invented means.

The volume rate of flow of gas entering the inner annular channel 24 can be selectively and infinitely varied from zero flow up to a predetermined maximum which is a function of the cross-sectional area of the apertures 28 in the upstream face 26 of the hub 14. In order to adjust the volume rate of flow of gas entering the inner annular converging channel 24, the inlet damper plate 30 is rotated about the axis of the bolt to move the apertures 32 formed therein into or out of registration with the apertures 28 in the upstream surface 26 of the hub 14 until the desired volume rate of flow of gas through the apertures 28 is arrived at. Of course, to shut off all gas flow into the inner annular converging channel 24, the inlet damper plate 30 is positioned so that the apertures 28 are completely out of registration with the aperture 26.

The foregoing detailed description is given primarily for clarity of understanding and no unnecessary limitations should be understood therefrom for modifications will be obvious to those skilled in the art upon reading this disclosure and may be made without departing from the spirit of the invention or the scope of the appended claims.

What is claimed is:

1. In a cyclone particulate matter gas separator of the type having a generally cylindrical housing having an inlet opening at one end for the ingress of a dirty gas stream to be cleaned, the improvement which comprises:

first means cooperating with the housing at the inlet opening thereof to define an outer annular channel converging in a generally axial direction of the housing from the exterior to the interior of the housing for directing a first stream of dirty gas into the housing and accelerating the first stream of dirty gas;

second means cooperating with the first means to define an inner annular channel concentrically disposed with the outer annular converging channel and converging in a generally axial direction of the housing from the exterior to the interior of the housing for directing a second stream of dirty gas into the housing and accelerating the second stream of dirty gas;

means for adjustably varying the volume rate of flow of the second stream of dirty gas into the inner annular channel; and, gas flow directing means disposed within the outer annular channel for imparting a whirling motion to the first gas stream flowing through the outer annular channel from the exterior to the interior of the housing.

2. The separator of claim 1, further comprising means defining an annular dirty gas stream mixing channel coaxially disposed to the outer annular channel and inner annular channel, and located downstream from the outlet ends of the outer annular channel and inner annular channel to receive the dirty gas streams exiting from both the outer and inner annular channels for allowing the first and second gas streams exiting from the outer and inner annular channels, respectively, to mix together.

3. The separator of claim 1, wherein the means defining the outer annular converging channel comprises:
the housing of the separator device having said inlet opening for the entrance of a dirty gas stream;
a hollow generally conoid shaped hub coaxially disposed within the inlet opening of the housing with the side wall of the conoid shaped hub radially spaced from the housing wall, thereby, defining the outer annular converging channel.

4. The separator of claim 3, wherein the means defining the inner annular converging channel comprises:
a generally conoid shaped body concentrically disposed within the hollow hub with the side wall of the conoid shaped body radially spaced from the wall of the hub, thereby, defining the inner annular converging channel between the side wall of the hub and side wall of the conoid shaped body.

5. The separator of claim 4, wherein the conoid shaped body extends axially downstream a predetermined distance beyond the conoid shaped hub, the wall of the extending portion of the conoid shaped body being radially spaced from the walls of the separator device, thereby, defining the annular mixing chamber therebetween.

6. The separator of claim 5, wherein the extending portion of the conoid shaped body comprises a cylindrical flange extending downstream from the periphery of the base of the conoid shaped body.

7. The separator of claim 6, wherein the conoid shaped body is a cone.

8. The separator of claim 3, wherein the means for adjustably varying the volume rate of dirty gas stream passing through the inner annular converging channel comprises:
the hollow conoid shaped hub has an upstream surface with a plurality of dirty gas inlet apertures formed therein; and
an inlet damper plate having a like number of apertures, the inlet plate being disposed in juxtaposition over the upstream surface of the hub and movably attached to the hub so that the apertures in the plate can be selectively moved into or out of registration with the dirty gas inlet apertures formed in the upstream surface of the hub.

9. The separator of claim 8, wherein:
the apertures formed in the upstream surface of the hub are disposed in a circular array;
the apertures formed in the damper plate are disposed in a circular array corresponding to the circulrr array of apertures in the upstream surface of the hub; and,
the damper plate is mounted to the upstream side of the upstream surface of the hub for rotation movement.

10. The separator of claim 1, wherein the gas flow directing means comprises a plurality of curved vanes.

* * * * *